US006349407B1

(12) United States Patent
Towfiq

(10) Patent No.: US 6,349,407 B1
(45) Date of Patent: Feb. 19, 2002

(54) METHOD AND APPARATUS FOR RE-INTRODUCING VERSION CONTROL

(75) Inventor: Mark M. Towfiq, Medford, MA (US)

(73) Assignee: Sun Microsystems, Incorporated, Palo Alto, CA (US)

( * ) Notice: Subject to any disclaimer, the term of this patent is extended or adjusted under 35 U.S.C. 154(b) by 946 days.

(21) Appl. No.: 08/580,965

(22) Filed: Dec. 29, 1995

(51) Int. Cl.[7] .............................................. G06F 9/445
(52) U.S. Cl. ........................................................ 717/11
(58) Field of Search ............................... 395/703, 702, 395/701, 712, 619; 717/3, 2, 1, 11

(56) References Cited

U.S. PATENT DOCUMENTS

| | | | | |
|---|---|---|---|---|
| 4,558,413 A | * | 12/1985 | Schmidt et al. | 364/300 |
| 4,809,170 A | * | 2/1989 | Leblang et al. | 364/200 |
| 4,912,637 A | * | 3/1990 | Sheedy et al. | 364/300 |
| 5,274,803 A | * | 12/1993 | Dubin et al. | 395/600 |
| 5,357,631 A | * | 10/1994 | Howell et al. | 395/600 |
| 5,481,722 A | * | 1/1996 | Skinner | 395/700 |
| 5,574,898 A | * | 11/1996 | Leblang et al. | 395/601 |
| 5,577,244 A | * | 11/1996 | Killebrew et al. | 395/703 |
| 5,630,138 A | * | 5/1997 | Raman | 395/712 |

OTHER PUBLICATIONS

W. Tichy, "RCS—A System for Version Control", 4.4BSD Programmer's Supplementary Documents (PSD), O'Reilly & Associates, Inc., pp. 13–1 to 13–14, Apr. 1994.*

E. Allman, "An Introduction to the Source Code Control System", 4.4BSD Programmer's Supplementary Documents (PSD), O'Reilly & Associates, Inc., pp. 14–1 to 14–14, Apr. 1994.*

V. Ambriola, L. Bendix and P. Ciancarini, "The Evolution of Configuration Management and Version Control", Software Eng. J., pp. 303–310, Nov. 1990.*

SunSoft, SPARCworks/TeamWare ProWorks/TeamWare Users Guide, pp. 1–292, 1995.*

Solaris Programming Utilities Manual, "SCCS Source Control Code System," pp. 1–38.

SPARCworks/TeamWare ProWorks/TeamWae Users Guide, pp. 1–292.

* cited by examiner

*Primary Examiner*—Majid Banankhah
*Assistant Examiner*—Sue Lao
(74) *Attorney, Agent, or Firm*—Squire, Sanders & Dempsey, LLP

(57) ABSTRACT

A method and apparatus for maintaining source control for successive versions of software where modifications are made to an initial version that are not included in the successive versions. When the initial version is received, it is modified and both the initial version and the modified initial version are placed under source control in the form of a source tree. When a new version of the software is received, the invention determines differences between the initial version and the new version and creates a record of differences between the initial version and the new version. The differences are integrated into a copy of the initial version and are then incorporated to the modified initial version, which is then incorporated to a modified initial version to yield a modified new version. In some embodiment of the present invention, the original source tree is retained in case modifications are again made to the initial version.

9 Claims, 5 Drawing Sheets

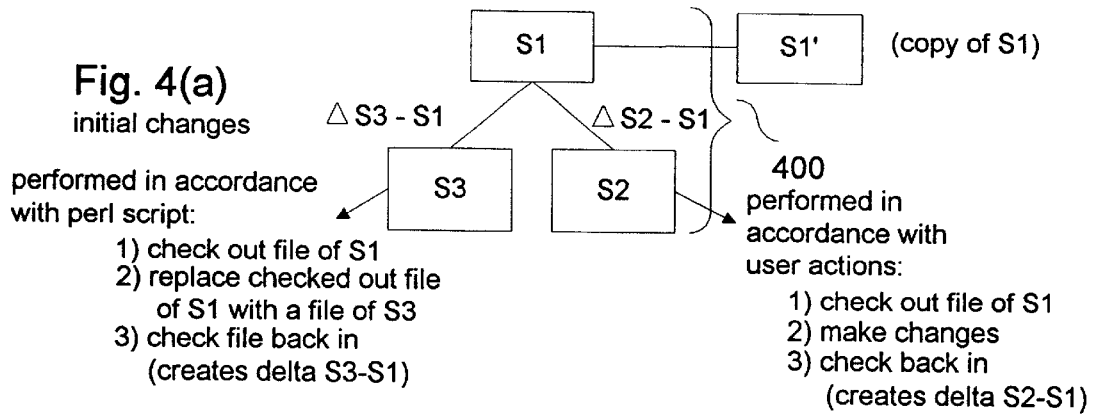

Fig. 4(a)
initial changes performed in accordance with perl script:
1) check out file of S1
2) replace checked out file of S1 with a file of S3
3) check file back in (creates delta S3-S1)

400 performed in accordance with user actions:
1) check out file of S1
2) make changes
3) check back in (creates delta S2-S1)

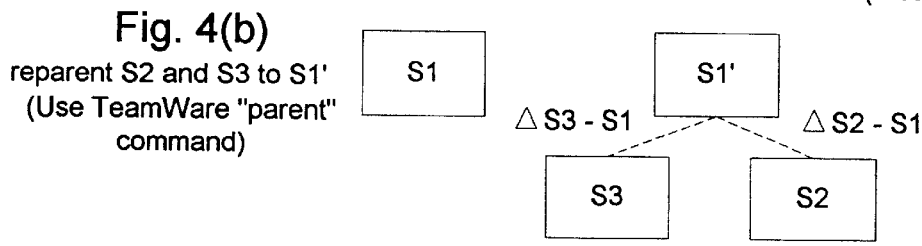

Fig. 4(b)
reparent S2 and S3 to S1'
(Use TeamWare "parent" command)

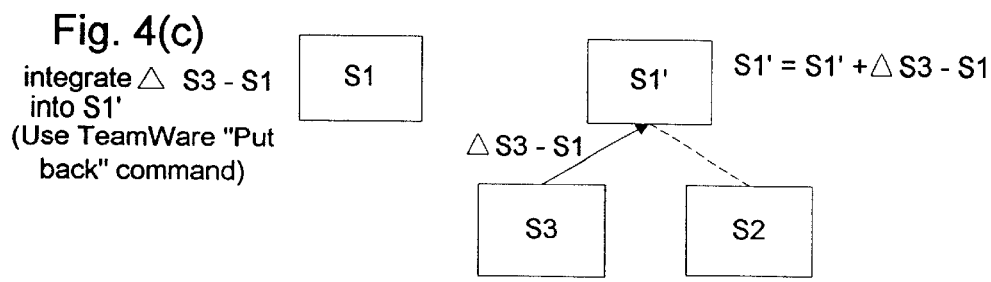

Fig. 4(c)
integrate △ S3 - S1 into S1'
(Use TeamWare "Put back" command)

S1' = S1' + △ S3 - S1

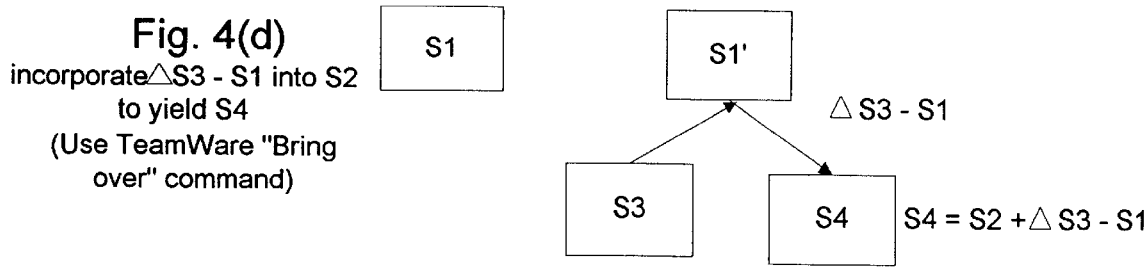

Fig. 4(d)
incorporate △S3 - S1 into S2 to yield S4
(Use TeamWare "Bring over" command)

S4 = S2 + △ S3 - S1

S1:
File 1: (Initial version)

```
/* this is how we sort it */
sort (array);

S2:
File 1: (in-house changes):

```
/* initialize array */
init(array);
/* this is how we sort it */
sort(array);

S3:
File 1: (outside changes):

```
/* this is how we sort it */
sort(array, 0);

S4:
File 1: (merged result):

```
/* initialize array */
init(array);
/* this is how we sort it */
sort(array, 0);

METHOD AND APPARATUS FOR RE-INTRODUCING VERSION CONTROL

BACKGROUND OF THE INVENTION

This invention relates to a method and apparatus for maintaining source control for software and, more particularly, to a method and apparatus for maintaining source control for new successive versions of software, where modifications that have been made to a first version are not included in the new version.

In commercial settings, it is common practice to purchase software from an outside source and to modify the purchased software so that it can be incorporated within another product. The software from the outside source often is received in a "source code" format, i.e., in a format easily read and understood by human beings. The purchasing company makes modifications to an initial version of the software and incorporates the modified software within its product.

A problem arises when the third party changes the initial version of its software to yield a new version and ships the new version to the purchasing company. The purchasing company does not have "source code control" over the purchased software, since it did not write either the initial version of the software or the new version of the software. Both the initial version and the new version of the software may be very large and may consist of many separate files. Moreover, in the interim, the purchasing company has modified the initial version of the software. It is problematic to ensure that any changes in the new version are integrated into the modified copy of the initial version.

SUMMARY OF THE INVENTION

The present invention provides a method and apparatus for maintaining source control in successive versions of software where modifications have been made to an initial version. The invention allows any changes in a new version of the software to be incorporated into the modified initial version of the software.

In accordance with the purpose of the invention, as embodied and broadly described herein, the invention is a method and apparatus for maintaining version control for an initial version of software stored in a memory, where the initial version has been modified to yield a modified initial version of the software that is also stored in the memory. The method comprises the steps, performed by a data processing system, of: creating, in the memory, a source tree containing the initial version and the modified initial version of the software; receiving a new version of the software; determining a difference between the new version and the initial version; integrating the difference between the new version and the initial version into a copy of the initial version to yield an integrated copy; and incorporating the integrated copy into a copy of the modified initial version to yield a modified new version.

Objects and advantages of the invention will be set forth in part in the description which follows and in part will be obvious from the description or may be learned by practice of the invention. The objects and advantages of the invention will be realized and attained by means of the elements and combinations particularly pointed out in the appended claims.

BRIEF DESCRIPTION OF THE DRAWINGS

The invention will now be described with reference to the accompanying drawings, wherein:

FIGS. 4(a) through 4(d) are diagrams illustrating results of the steps of FIGS. 2 and 3.

FIGS. 5(a) through 5(d) show examples of the contents of versions S1–S4.

DETAILED DESCRIPTION OF THE PREFERRED EMBODIMENTS

The following description is of the best presently contemplated modes of carrying out the invention. This description is made for the purpose of illustrating the general principles of the invention and is not to be taken in a limiting sense.

Figure 1:
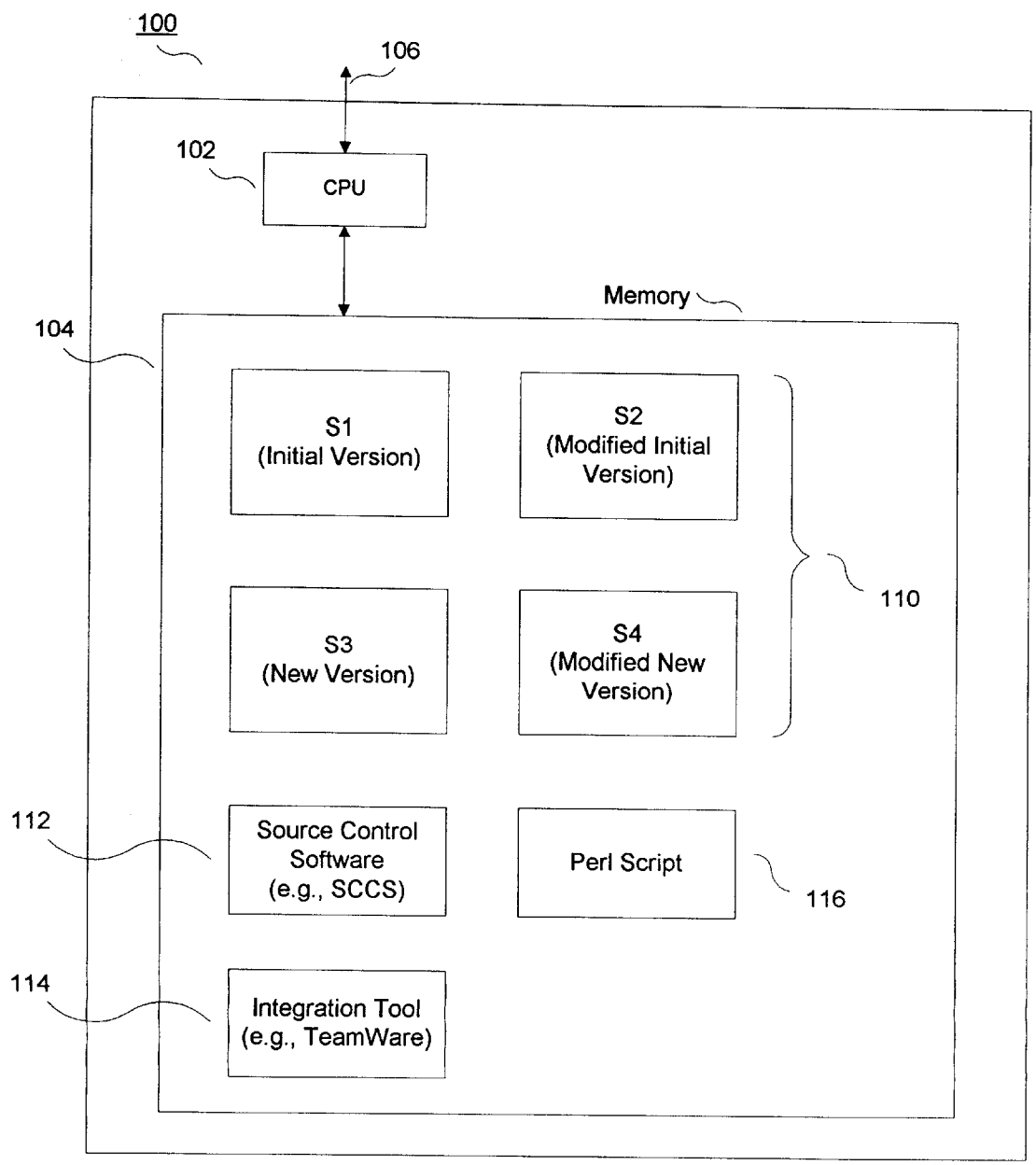
FIG. 1 is a block diagram of a computer system in accordance with a preferred embodiment of the present invention.

FIG. 1 is a block diagram of a computer system 100 in accordance with the present invention. Computer system 100 includes a CPU 102, a memory 104, and input/output lines 106. It will be understood by persons of ordinary skill in the art that computer system 100 can also include numerous elements not shown in the Figure for the sake of clarity, such as disk drives, keyboards, display devices, network connections, additional memory, additional CPUs, LANs, etc.

Memory 104 includes a plurality 110 of software elements S1, S2, S3, and S4. The software elements S1, S2, S3, and S4 preferably consist of source code written in a computer programming language, such as C. S1 is an "initial version" of a software program received from a supplying third party that is not within a source control system. S2 is a "modified version" of initial version S1 that has been created after S1 is received from the supplying third party. The modifications of S2 are made by, e.g., a company that modifies S1 to incorporate it into one of its products. S3 is a "new version" of S1 made by the original maker of S1. S3 does not include the modifications made for S2. S4 is a "modified new version" that incorporates both the changes of S3 and the modifications of S2. Each of software elements S1, S2, S3, and S4 preferably contains a plurality of files.

A preferred embodiment of the invention executes under the Solaris Unix operating system, Version 2.5. Solaris is a registered trademark of Sun Microsystems, Inc. Unix is a registered trademark in the United States and other countries, exclusively licensed through X/OPEN, Ltd. The invention can be implemented in conjunction with any appropriate operating system.

Memory 104 also includes source control software 112, integration tool software 114, and a script 116. Source control software 112 preferably is the SCCS (Source Code Control System) tool, which is shipped with the Solaris operating system. SCCS is described in Chapter 1 of the Solaris "Programming Utilities Manual," which chapter is herein incorporated by reference. SCCS allows a user to control write access to source files and to monitor changes made to the files. SCCS creates a "source control tree" containing various versions of a file (see, e.g., FIG. 4). Differences between different versions of a file are stored as "delta" information, as discussed below.

Integration tool software 114 preferably is the "SPARCworks/TeamWare" software program, version 1.02, available from Sun Microsystems. "TeamWare" is described in "SPARCworks/TeamWare, ProWorks/TeamWare Users Guide," which is herein incorporated by reference. TeamWare allows a user to modify source trees created by SCCS.

Script 116 of FIG. 1 preferably is a script written in the Perl programming language. "Perl" stands for "Practical Extraction Report Language" and is a language used in the Unix operating system to handle system administrator functions. In the embodiment of FIG. 1, script 116 contains SCCS commands to execute steps 208–216 of FIG. 2, as discussed below.

Figure 2:
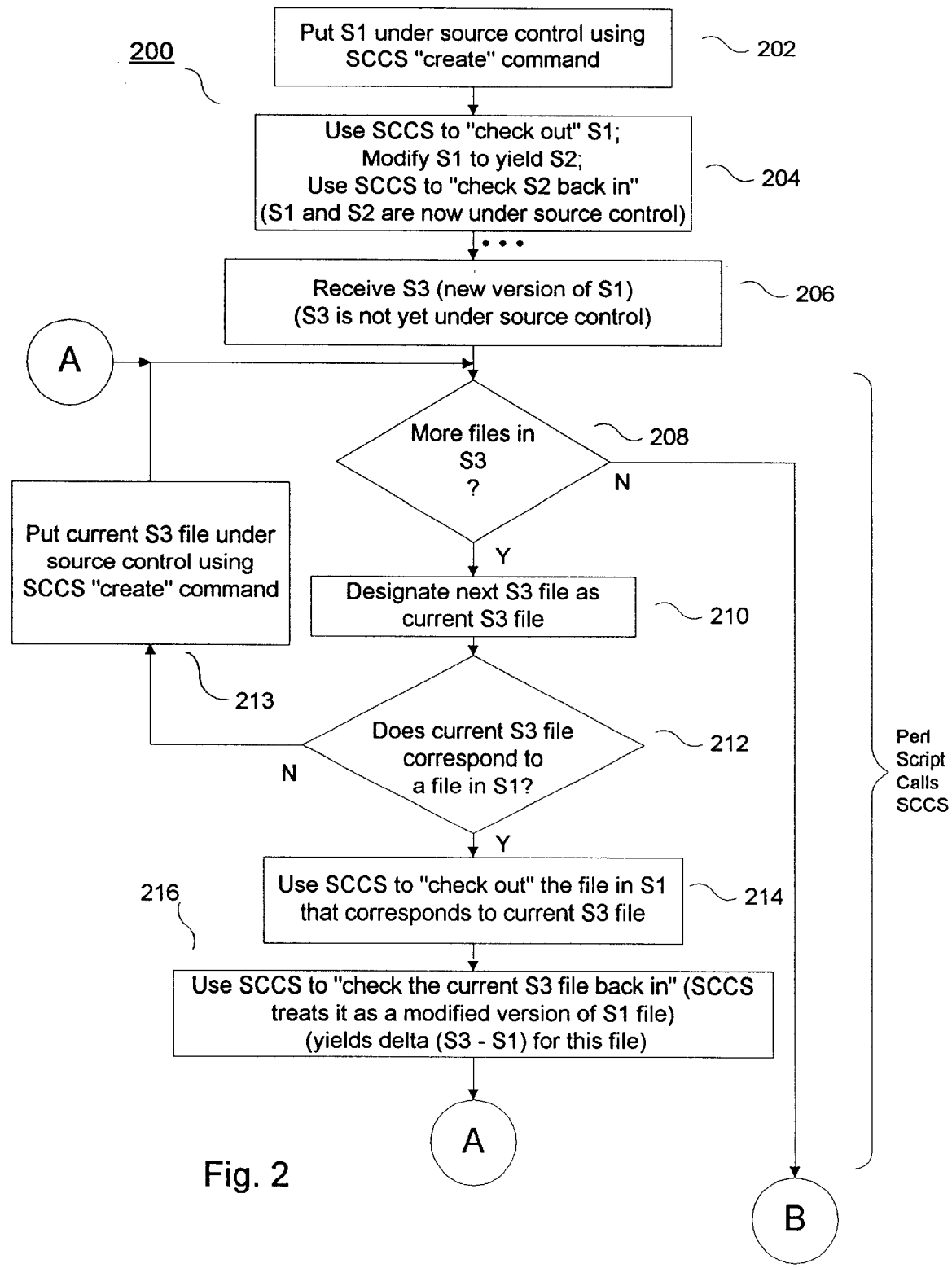
FIG. 2 is a flow chart showing steps performed by a processor of the system of FIG. 1 to integrate changes in a new version S3 of software into a modified version S2 under source control of an initial version S1 of the software to yield software S4 which is also under source control.
Figure 3:
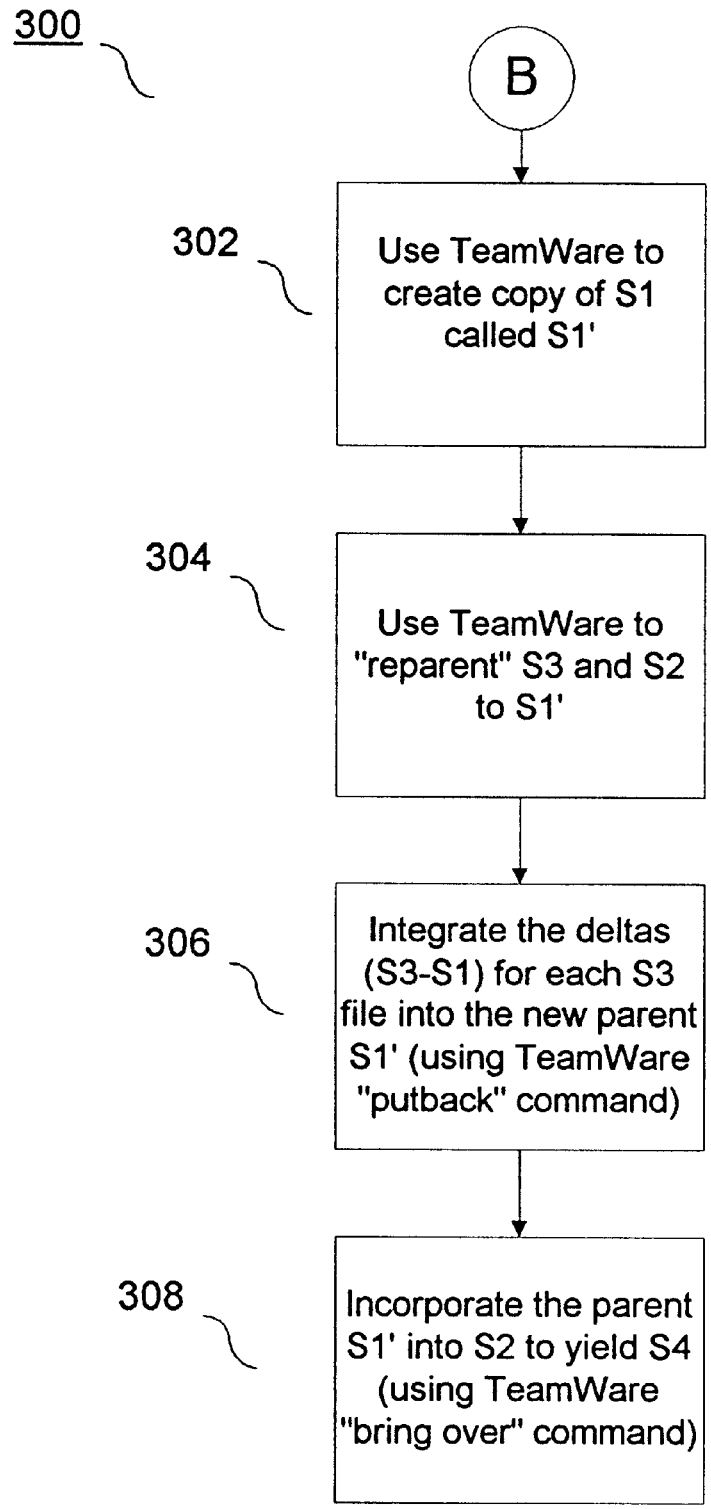
FIG. 3 is a flow chart showing additional details of the method of FIG. 2.

FIGS. 2 and 3 are flow charts showing steps that are performed by processor 102 of the system of FIG. 1. These flow charts show how the present invention creates a modified version (S2) of software and how changes in the new version (S3) are incorporated into the modified version to yield a modified new version (S4) of the software. It will be understood by persons of ordinary skill in the art that step 202 of FIG. 2 preferably is initiated under operator control and performed by the SCCS tool. Step 204 preferably is initiated by a computer programmer and is performed using known computer tools such as compilers and debuggers. Steps 206–216 of FIG. 2 preferably are controlled by script 116, which includes SCCS commands. The steps of FIG. 3 preferably are performed as a human user issues a series of TeamWare commands. The steps of FIGS. 2 and 3 will be explained below in conjunction with FIGS. 4(a) through 4(d).

As explained above, software S1 is software received from an supplying third party, such as another company. When S1 is received, its files are immediately put under "source control" by way of source control software 112 in step 202 (see element 402 of FIG. 4(a)). This step preferably is accomplished by using the SCCS "create" command. At a later time, in step 204, a computer programmer "checks out" one or more of the files of S1 from SCCS and edits, modifies, and/or improves the file(s) to yield software S2. The user then preferably uses SCCS to "check the S2 files back in." After step 204, memory 104 contains information representing the fact that the file(s) S2 are a modified version of the file(s) of S1 (see FIG. 4(a)).

At some later time, a new version of S1 (called S3) is created by the supplying third party and shipped to the purchasing company (step 206). The purchasing company wishes to integrate the changes of the new version S3 into the modified initial version (i.e., into S2). The method of the present invention accomplishes this goal.

Steps 208 through 216 are repeated for each file in new version S3. Steps 208 through 216 preferably are performed under control of Perl script 116, which issues SCCS commands. In step 208, if S3 still contains unprocessed files, control passes to step 210. Otherwise, processing passes to FIG. 3. In step 210, a current file of S3 is determined. In step 212, the processor determines whether the current S3 file corresponds to a file in S1. (The described embodiment assumes that corresponding files have the same name.) If no file in S1 corresponds to the current S3 file, then the current S3 file is put under source control using the SCCS "create" command. If a corresponding S1 file exists, in step 214, the processor (via source control software 112 under control of script 116) "checks out" the corresponding S1 file using the SCCS "check out" command. Checking out a file of S1 increments the version number of the individual file, making the file available for editing.

In step 216, processor 102 replaces the checked out S1 file with the corresponding S3 file (see FIG. 4(a)) and returns ("checks back in") the replaced file via software 112 under control of script 116. After step 216, control returns to step 208 until all files of S3 have been processed. The term "delta S3–S1" represents differences between all corresponding files of S3 and S1.

Once S3 has been integrated into the source tree (see FIG. 4(a)), processor 102 uses integration tool software 114 to integrate and incorporate the changes of S3 into S2. FIG. 3 shows the details of this step. S1 is called the "parent" of S2 and S3. In step 302 of FIG. 3, processor 102 creates a copy of S1 (called S1'). S3 and S2 are then "reparented" to S1' (see FIG. 4(b)) in step 304. In step 306, processor 102 executes integration tool software 114 (the TeamWare "putback" command) to integrate (delta S3–S1) into S1' to yield a modified S1' (see FIG. 4(c)). In step 308, processor 102 incorporates S1' into S2 to yield the modified new S4 software (see FIG. 4(d)) via the TeamWare "bring over" command.

After step 308, a second source tree has been created within the source control system that has the parent S1'. Software S1', which is called an "integrated copy," represents the initial version S1 plus the changes of the new version S3. S4 is a child of S1' and represents S2 plus the changes S3–S1. Thus, S4 is under source control and includes both the modifications of S2 and the changes of S3. (If S3 "undoes" a change in S2, integration tool 114 flags the file as being changed by both and prompts a user for instructions on how to resolve the situation. This, for example, is the function of the "resolve" and "filemerge" functions in Teamware).

It will be understood by persons of ordinary skill in the art that the source tree of FIG. 4(a) still exists at this point and that additional changes to S1 can be incorporated under source control by a repetition of the described steps from source tree 400. In a preferred embodiment, all source trees are maintained so that changes to S3 can be incorporated under source control by repetition of the described steps for source tree 400. Modifications of any version (e.g., S1, S3, etc.) can be incorporated into the system.

FIG. 5(a) shows exemplary contents of a first file of software S1. The software S1 includes a file that contains three source code statements 502 in the C programming language. FIG. 5(b) shows exemplary contents of a first file of software S2. In the example, two source code statements 504 have been added to the statements of S1 and a source statement 505 has been modified. Once S1 and S2 are put under source control, S1 and S2 together form source tree 400.

FIG. 5(c) shows exemplary contents of software S3. In the example, statement 506 is modified to add another parameter to the procedure "sort." Statement 507 is also modified from how it originally appeared in S1. Note that the modifications to S1 to yield S3 are not included in S2, which is under source control. S1 is removed from source control. When S3 is reintroduced to source control in accordance with the present invention, a resulting source control tree including S1, S2, and S3 results. S2 and S3 are reparented to a copy of S1 called S1'. The difference S3–S1 is integrated into S1' to yield an integrated copy. The integrated copy is integrated into S2 to yield S4. S4 incorporates both the modifications of S2 and the changes of S3.

It will be understood that various modifications may be made without departing from the spirit and scope of the invention. For example, the present invention could also be used to manage changes to documentation, to a database, or to any project where modifications are coming from sources outside of a control mechanism. It is intended that the specification and examples be considered exemplary only, with a true scope of the invention being indicated by the following claims and equivalents.

I claim:

1. A method of maintaining version control for an initial version S1 of software stored in a memory, where the initial version has been modified to yield a modified initial version S2 of the software that is also stored in the memory, the method comprising the steps, performed by a data processing system, of:

creating, in the memory, a source tree containing the initial version S1 and the modified initial version S2 of the software;

receiving a new version S3 of the software;

determining a difference between the new version S3 and the initial version S1;

integrating the difference between the new version and the initial version (S3−S1) into a copy of the initial version S1' to yield an integrated copy; and incorporating the integrated copy into a copy of the modified initial version S2 to yield a modified new version S4, while still retaining the initial version S1 and its modified initial version S2.

2. The method of claim 1, wherein the difference determining step includes the step of adding the new version S3 to the source tree as a child of the initial version S1.

3. The method of claim 2, wherein the adding step includes the steps of:

checking out a file of the initial version S1 from the source tree; and checking in a corresponding file of the new version S3 into the source tree, so that the corresponding file of new version S3 is placed in the source tree as a modification of the file of the initial version S1.

4. The method of claim 1, wherein the integrating step includes the step of reparenting the modified initial version S2 and the new version S3 with the copy of the initial version S1'.

5. The method of claim 1, wherein, after performance of the incorporating step, there exists in the memory a first source tree having the initial version S1 as a root, and a second source tree having the integrated copy as a root.

6. The method of claim 1, wherein the difference determining step includes the steps, performed for each file in the new version S3, of:

checking out a file of S1 that corresponds to a current S3 file;

copying the current S3 file over the checked out file; and checking in the file created by copying over, so that the file created by copying over is placed in the source tree as a child of the initial file S1.

7. An apparatus for maintaining version control for an initial version S1 of software, where the initial version has been modified to yield a modified initial version S2 of the software, the apparatus comprising:

a memory;

first source controller circuitry, coupled to the memory, provided to create in the memory a source tree for the initial version S1 and the modified initial version S2 of the software;

input circuitry, provided to receive a new version S3 of the software from a supplying third party;

second source controller circuitry, coupled to the input circuitry, provided to determine a difference between the new version S3 and the initial version S1;

first software tool circuitry, coupled to the second source controller circuitry, provided to integrate the difference between the new version and the initial version S3−S1 into a copy S1' of the initial version to yield an integrated copy; and second software tool circuitry, coupled to the first software tool circuitry, provided to incorporate the integrated copy into a copy of the modified initial version S2 to yield a modified new version S4.

8. A method of maintaining version control for an initial version S1 of software stored in a memory, where the initial version has been modified to yield a modified initial version S2 of the software that is also stored in the memory, the method comprising the steps, performed by a data processing system, of:

creating, by an SCCS command, in the memory, a source tree containing the initial version S1 and the modified initial version S2 of the software;

receiving a new version S3 of the software;

determining, by an SCSS command, a difference between the new version S3 and the initial version S1;

integrating, by a TeamWare command, the difference between the new version and the initial version (S3−S1) into a copy of the initial version S1' to yield an integrated copy; and incorporating, by a TeamWare command, the integrated copy into a copy of the modified initial version S2 to yield a modified new version S4, while still retaining the initial version S1 and its modified initial version S2.

9. The method of claim 8, wherein the determining step is performed by:

checking out a file of the initial version S1 from the source tree; and checking in a corresponding file of the new version S3 into the source tree, so that the corresponding file of new version S3 is placed in the source tree as a modification of the file of the initial version S1.

* * * * *